H. E. ARGO.
GREASE CUP.
APPLICATION FILED AUG. 25, 1917.
1,253,922.
Patented Jan. 15, 1918.
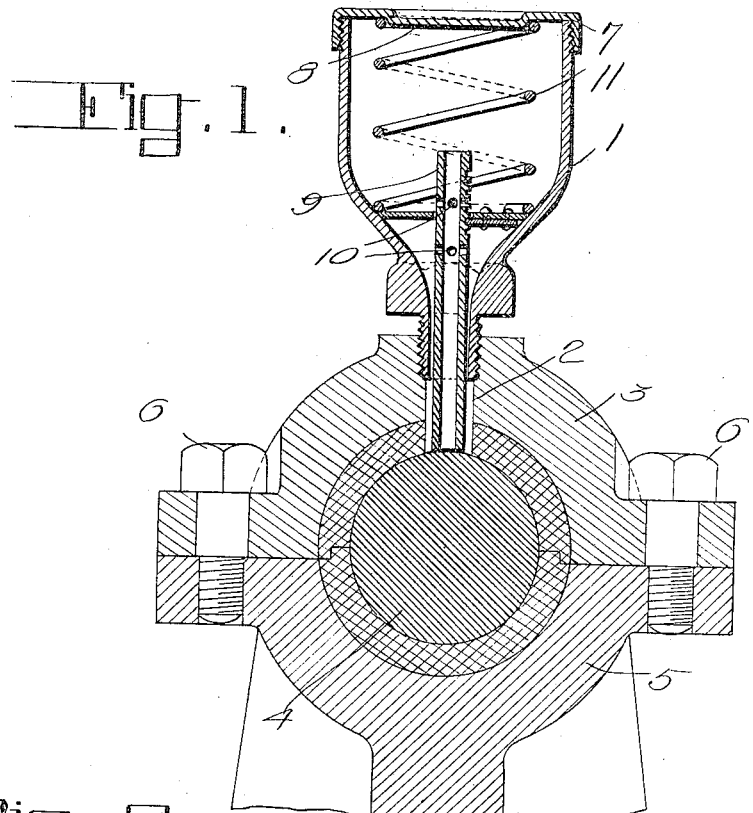
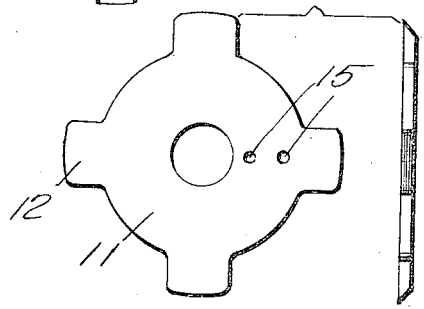
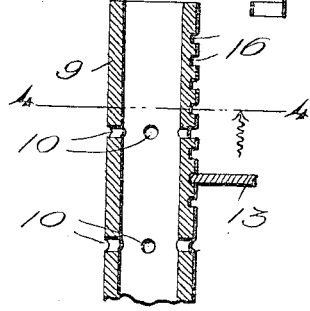
INVENTOR
Horace E. Argo
BY
ATTORNEYS
WITNESSES

UNITED STATES PATENT OFFICE.

HORACE E. ARGO, OF OAK PARK, ILLINOIS.

GREASE-CUP.

1,253,922.  Specification of Letters Patent.  Patented Jan. 15, 1918.

Application filed August 25, 1917. Serial No. 188,127.

*To all whom it may concern:*

Be it known that I, HORACE E. ARGO, a citizen of the United States, and a resident of Oak Park, in the county of Cook and State of Illinois, have invented new and useful Improvements in Grease-Cups, of which the following is a specification.

My invention is an improvement in grease cups, and the invention consists in certain novel constructions and combinations of parts hereinafter described and claimed.

In the drawings:

Figure 1 is a transverse vertical section of the improved cup;

Fig. 2 is a plan and edge view of the washer;

Fig. 3 is a vertical section of the tube;

Fig. 4 is a section on the line 4—4 of Fig. 3;

Fig. 5 is a plan and end view of the pawl.

In the present embodiment of the invention, the oil cup 1, which is of the usual construction, has threaded engagement with an opening 2 in the upper section 3 of the bearing in the shaft 4, the said bearing consisting of upper and lower sections 3 and 5 detachably connected, as indicated at 6.

The cup 1 has a cover 7, which is threaded on to the cup, and is provided at its center with a circular depression 8. A tube 9 is mounted loosely in the opening 2 and in the cup, the said tube contacting at its lower end with the shaft 4, and this tube has its upper end open and is provided with radial openings 10 for permitting the grease to pass from the cup 1 through the tube to the bearing of the shaft.

A coil spring 11ª is arranged within the oil cup, between the cover 7 and a washer 11 which is arranged within the cup. This washer, as shown more particularly in Fig. 2, has four radial lugs 12, the said lugs being arranged at intervals of ninety degrees with respect to each other, and a pawl 13, shown in Fig. 5, is riveted to the washer, the pawl and the washer having registering openings 14 and 15, respectively, adapted to register to receive the rivets. This tube 9 has a series of notches 16 in its side wall, the said notches being arranged in spaced relation as shown, and they are adapted for engagement by the pawl 13 to hold the tube and the washer in adjusted position.

The coil spring 11ª is arranged between the washer and the cover 7, and one end of the spring encircles the depression 8, being held in place by the annular shoulder formed between the depression and the body of the cover. The other end of the spring rests upon the washer 11, and it will be evident that the position of the tube 9 may be adjusted by means of the pawl 13, by engaging the said pawl with different notches 16.

In use, the cup 1 is filled with oil or other lubricant, and the tube is adjusted so that the lower end thereof will move in contact with the shaft. The lubricant feeds through the top of the tube and through the radial openings 10 to the shaft, thus thoroughly lubricating the same.

In practice, the opening through the washer 11 is larger than the external diameter of the tube 9, and the pawl 13 has a certain degree of resiliency so that the washer may be adjusted. The engagement between the pawl and the tube is such as to permit movement of the washer longitudinally of the tube when a certain amount of force is exerted, while normally holding the parts in adjusted position.

I claim:

1. In a bearing, a shaft and an oil cup, of a tube extending through the oil cup into contact with the shaft, said tube having its ends open and having radial openings within the cup, and a spring normally pressing the tube toward the shaft, said tube having transverse notches, a washer encircling the tube and having a pawl for engaging the notches, and a coil spring normally pressing the washer downward.

2. In a bearing, the combination with the shaft and the oil cup, of a tube extending through the oil cup into contact with the shaft, said tube having its ends open and having radial openings within the cup, and a spring normally pressing the tube toward the shaft.

HORACE E. ARGO.

Witnesses:
IRVING E. HANSEN,
PAUL OWEN.

Copies of this patent may be obtained for five cents each, by addressing the "Commissioner of Patents, Washington, D. C."